US010504457B2

(12) United States Patent
Wang et al.

(10) Patent No.: US 10,504,457 B2
(45) Date of Patent: Dec. 10, 2019

(54) METHOD FOR DRIVING A PASSIVE MATRIX FOR AN ELECTROPHORETIC DISPLAY

(71) Applicant: E INK CALIFORNIA, LLC, Fremont, CA (US)

(72) Inventors: Ming Wang, Fremont, CA (US); Craig Lin, Oakland, CA (US); Hui Du, Milpitas, CA (US); HongMei Zang, Fremont, CA (US); Xiaojia Zhang, Fremont, CA (US)

(73) Assignee: E INK CALIFORNIA, LLC, Fremont, CA (US)

( * ) Notice: Subject to any disclaimer, the term of this patent is extended or adjusted under 35 U.S.C. 154(b) by 424 days.

(21) Appl. No.: 15/383,240

(22) Filed: Dec. 19, 2016

(65) Prior Publication Data

US 2017/0098417 A1    Apr. 6, 2017

Related U.S. Application Data

(63) Continuation of application No. 14/849,480, filed on Sep. 9, 2015, now Pat. No. 9,557,623, which is a continuation-in-part of application No. 13/853,367, filed on Mar. 29, 2013, now abandoned.

(51) Int. Cl.
*G09G 3/34* (2006.01)
*G02F 1/167* (2019.01)
*G09G 3/20* (2006.01)
*G02F 1/1675* (2019.01)

(52) U.S. Cl.
CPC .............. *G09G 3/344* (2013.01); *G02F 1/167* (2013.01); *G09G 3/2003* (2013.01); *G02F 2001/1678* (2013.01)

(58) Field of Classification Search
CPC .. G02F 1/167; G02F 2001/1678; G09G 3/344
See application file for complete search history.

(56) References Cited

U.S. PATENT DOCUMENTS

| 6,859,302 B2 | 2/2005 | Liang |
| 6,930,818 B1 | 8/2005 | Liang |
| 8,115,729 B2 | 2/2012 | Danner |
| 8,363,306 B2 | 1/2013 | Du |

(Continued)

OTHER PUBLICATIONS

Nikkei Microdevices. (Dec. 2002) Newly-Developed Color Electronic Paper Promises—Unbeatable Production Efficiency. Nikkei Microdevices, p. 3.(in Japanese, with English translation) Dec. 1, 2002.

(Continued)

*Primary Examiner* — Laurence J Lee
(74) *Attorney, Agent, or Firm* — Brian D. Bean

(57) ABSTRACT

The present invention is directed to methods of passively driving an electrophoretic display. The electrophoretic fluid comprises three types of particles wherein two types particles are charged pigment particles having opposite charge polarities and contrasting colors. The third type of particle is larger in diameter than the first and second types of particles, and is less charged than the first and second types of particles, i.e., the third particle type is substantially uncharged. The electrophoretic medium is driven with two sets of electrodes, each set comprising a number of addressable electrodes.

15 Claims, 16 Drawing Sheets

(56) References Cited

U.S. PATENT DOCUMENTS

Figure 1:
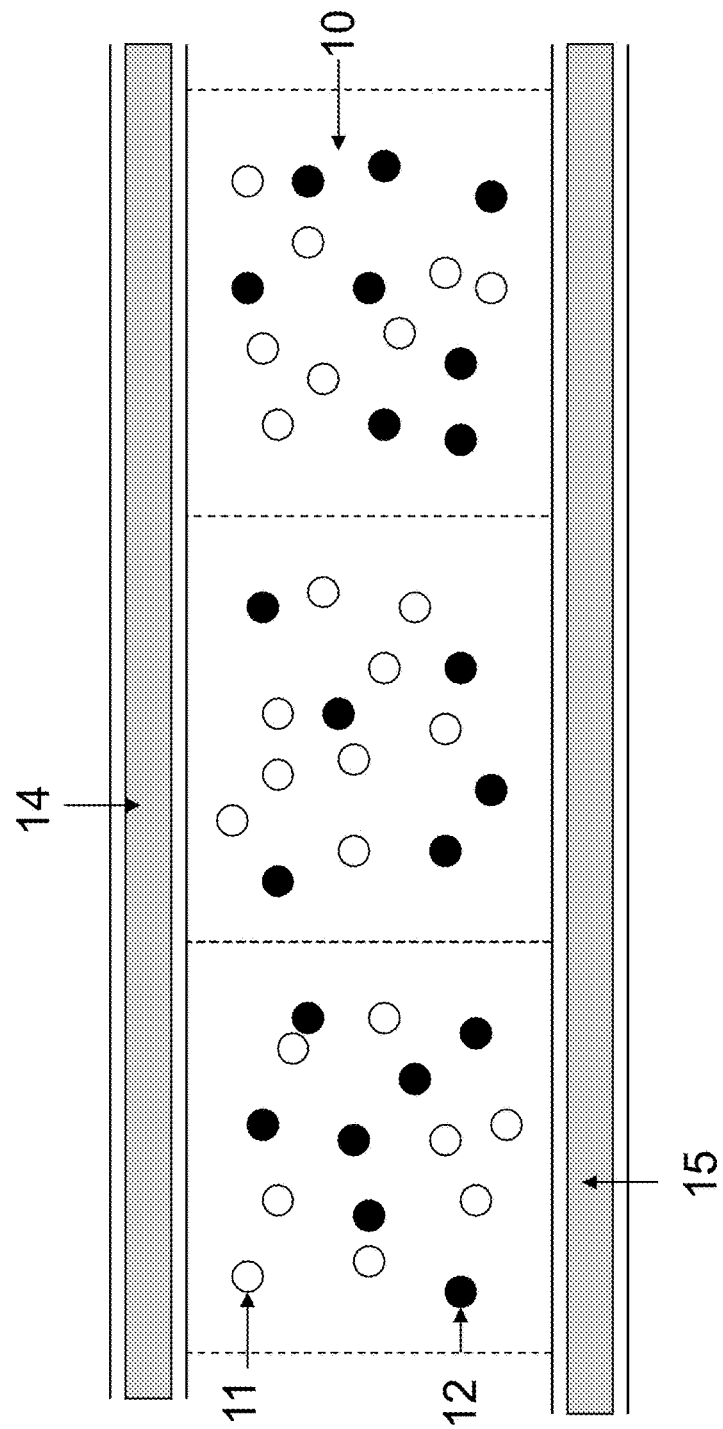

| | | | |
|---|---|---|---|
| 8,570,639 B2* | 10/2013 | Masuzawa | G02F 1/167 345/107 |
| 8,674,978 B2 | 3/2014 | Komatsu | |
| 9,382,427 B2 | 7/2016 | Du | |
| 2008/0062159 A1* | 3/2008 | Roh | G02F 1/167 345/205 |
| 2008/0303778 A1* | 12/2008 | Machida | G02B 26/026 345/107 |
| 2011/0025681 A1* | 2/2011 | Komatsu | G02F 1/167 345/214 |
| 2014/0011913 A1 | 1/2014 | Du | |
| 2014/0092465 A1* | 4/2014 | Wang | G02F 1/167 359/296 |
| 2014/0293398 A1 | 10/2014 | Wang | |
| 2015/0378236 A1 | 12/2015 | Wang | |

OTHER PUBLICATIONS

Liang, R.C., Hou, J., & Zang, H.M. (Dec. 2002) Microcup Electrophoretic Displays by Roll-to-Roll Manufacturing Processes. IDW, EP2-2, 1337-1340. Dec. 4, 2002.

Liang, R.C. (Feb. 2003) Microcup Electrophoretic and Liquid Crystal Displays by Roll-to-Roll Manufacturing Processes. Presentation conducted at the Flexible Microelectronics & Displays Conference of U.S. Display Consortium, Phoenix, Arizona, USA. Feb. 3, 2003.

Liang, R.C., & Tseng, S. (Feb. 2003). Microcup LCD, A New Type of Dispersed LCD by a Roll-to-Roll Manufacturing Process. Paper presented at the IDMC, Taipei, Taiwan. Feb. 18, 2003.

Liang, R.C., Hou, J., Zang, H.M., & Chung, J. (Feb. 2003). Passive Matrix Microcup Electrophoretic Displays. Paper presented at the IDMC, Taipei, Taiwan. Feb. 18, 2003.

Liang, R.C., Hou, J., Zang, H.M., Chung, J., & Tseng, S. (Feb. 2003). Microcup Displays: Electronic Paper by Roll-to-Roll Manufacturing Processes. Journal of the SID, 11(4), 621-628. Feb. 18, 2003.

Chen, S.M. (May 2003) The New Application and the Dynamics of Companies. TRI. 1-10. (In Chinese, English abstract attached) May 1, 2003.

Liang, R.C., Hou, J., Chung, J., Wang, X., Pereira, C., & Chen, Y. (May 2003). Microcup Active and Passive Matrix Electrophoretic Displays by a Roll-to-Roll Manufacturing Processes. SID 03 Digest, Paper 20.1. May 21, 2003.

Lee, H. & Liang, R.C. (Jun. 2003) SiPix Microcup Electronic Paper—An Introduction. Advanced Display, Issue 37, 4-9 (in Chinese, English abstract attached) Jun. 1, 2003.

Chen, S.M. (Jul. 2003) The Applications for the Revolutionary Electronic Paper Technology. OPTO News & Letters, 102, 37-41. (in Chinese, English abstract attached) Jul. 1, 2003.

Zang, H.M., and Liang, R.C. (2003) Microcup Electronic Paper by Roll-to-Roll Manufacturing Processes. The Spectrum, 16(2), 16-21. Jul. 1, 2003.

Allen, K. (Oct. 2003). Electrophoretics Fulfilled. Emerging Displays Review: Emerging Display Technologies, Monthly Report—Oct. 2003, 9-14. Oct. 1, 2003.

Kleper, M., Miller, P., Miller L. (Oct. 2003) An Investigation of the Emerging and Developing Technologies Related to the Generation Beyond Print-on-Paper. Advanced Display Technologies, Oct. 2003, pp. 13-15, Rochester Institute of Technology (R.I.T.) Oct. 1, 2003.

Zang, H.M. (Oct. 2003). Microcup Electronic Paper by Roll-to-Roll Manufacturing Processes. Presentation conducted at the Advisory Board Meeting, Bowling Green State University, Ohio, USA. Oct. 23, 2003.

Chung, J., Hou, J., Wang, W., Chu, L.Y., Yao, W., & Liang, R.C. (Dec. 2003). Microcup Electrophoretic Displays, Grayscale and Color Rendition. IDW, AMD2 & EP1-2, 243-246. Dec. 1, 2003.

Ho, C. & Liang, R.C. (Dec. 2003). Microcup Electronic Paper by Roll-to-Roll Manufacturing Processes. Presentation conducted at FEG, Nei-Li, Taiwan. Dec. 23, 2003.

Zang, H.M. (Feb. 2004). Microcup Electronic Paper. Presentation conducted at the Displays & Microelectronics Conference of U.S. Display Consortium, Phoenix, Arizona, USA. Feb. 10, 2004.

Wang, X., Kiluk, S., Chang, C., & Liang, R.C. (Feb. 2004). Microcup Electronic Paper and the Converting Processes. ASID, 10.1.2-26, 396-399, Nanjing, China, Feb. 15, 2004.

Chaug, Y.S., Haubrich, J.E., Sereda, M. and Liang, R.C. (Apr. 2004). Roll-to-Roll Processes for the Manufacturing of Patterned Conductive Electrodes on Flexible Substrates. Mat. Res. Soc. Symp. Proc., vol. 814, I9.6.1. Apr. 12, 2004.

Liang, R.C. (Apr. 2004). Microcup Electronic Paper by Roll-to-Roll Manufacturing Process. Presentation at the Flexible Displays & Electronics 2004 of Intertech, San Fransisco, California, USA. Apr. 28, 2004.

Hou, J., Chen, Y., Li, Y., Weng, X., Li, H. and Pereira, C. (May 2004). Reliability and Performance of Flexible Electrophoretic Displays by Roll-to-Roll Manufacturing Processes. SID Digest, 32.3, 1066-1069. May 27, 2004.

Wang, X., Kiluk, S., Chang, C., & Liang, R.C., (Jun. 2004) Microcup Electronic Paper and the Converting Processes. Advanced Display, Issue 43, 48-51 (in Chinese, with English abstract) Jun. 1, 2004.

Liang, R.C., Zang, H.M., Wang, X., Chung, J. & Lee, H., (Jun./Jul. 2004) Format Flexible Microcup Electronic Paper by Roll-to-Roll Manufacturing Process, Presentation conducted at the 14th FPD Manufacturing Technology EXPO & Conference. Jul. 2, 2004.

Liang, R.C. (Oct. 2004) Flexible and Rollable Displays/Electronic Paper—A Technology Overview. Paper presented at the METS 2004 Conference in Taipei, Taiwan. Oct. 22, 2004.

Bardsley, J.N. & Pinnel, M.R. (Nov. 2004) Microcup Electrophoretic Displays. USDC Flexible Display Report, 3.1.2. pp. 3-12-3-16. Nov. 1, 2004.

Zang, H.M. & Hou, Jack, (Feb. 2005) Flexible Microcup EPD by RTR Process. Presentation conducted at 2nd Annual Paper-Like Displays Conference, Feb. 9-11, 2005, St. Pete Beach, Florida. Feb. 10, 2005.

Liang, R.C., (Feb. 2005) Flexible and Rollable Displays/Electronic Paper—A Brief Technology Overview. Flexible Display Forum, 2005, Taiwan. Feb. 17, 2005.

Wang, X. et al. (Feb. 2006) Inkjet Fabrication of Multi-Color Microcup Electrophorectic Display. The 5th Flexible Microelectronics & Displays Conference of U.S. Display Consortium ( Feb. 2006), Phoenix, Arizona Feb. 9, 2006.

Zang, H.M., Wang, W., Sun, C., Gu, H., and Chen, Y. (May 2006) Monochrome and Area Color Microcup EPDs by Roll-to-Roll Manufacturing Processes. ICIS 06 International Congress of Imaging Science Final Program and Proceedings, pp. 362-365. May 9, 2006.

Wang, X., Zang, H.M. and Li, P. (Jun. 2006) Roll-to-Roll Manufacturing Process for Full Color Electrophoretic film. SID 06 Digest, pp. 1587-1589. Jun. 8, 2006.

Zang, H.M. (Sep. 2006) Monochrome and Area Color Microcup EPDs by Roll-to-Roll Manufacturing Process. Presentation conducted at the Fourth Organic Electronics Conference and Exhibition (OEC-06), Sep. 25-27, 2006, Frankfurt, Germany. Sep. 26, 2006.

Zang, H.M. (Feb. 2007) Developments in Microcup Flexible Displays. Presentation conducted at the 6th Annual Flexible Display and Microelectronics Conference, Phoenix, AZ Feb. 6-8. Feb. 7, 2007.

Zang, H.M., Wang, F., Kang, Y.M., Chen, Y. and Lin, W. (Jul. 2007) Microcup e-Paper for Embedded and Flexible Designs. IDMC'07, Taipei International Convention Center, Taiwan. Jul. 6, 2007.

Sprague, R.A. (Sep. 23, 2009) SiPix Microcup Electrophoretic Epaper for Ebooks. NIP 25, 2009 pp. 460-462. (Presentation conducted on Sep. 23, 2009 at the 25th Int'l Conference on Digital Printing Technologies,Louisville, Kentucky, USA.) Sep. 23, 2009.

Zang, H.M, Hwang, J.J., Gu, H., Hou, J., Weng, X., Chen, Y. et al. (Jan. 2004). Threshold and Grayscale Stability of Microcup Electronic Paper. Proceeding of SPIE-IS&T Electronic Imaging, SPIE vol. 5289, 102-108. Jan. 19, 2004.

Ho, Candice. (Feb. 1, 2005) Microcup Electronic Paper Device and Application. Presentation conducted at USDO 4th Annual Flexible Display Conference 2005 Feb. 1, 2005.

(56) References Cited

OTHER PUBLICATIONS

Ho, Andrew, "Embedding e-Paper in Smart Cards, Pricing Labels & Indicators", Presentation conducted at Smart Paper Conference, Atlanta, GA, USA (Nov. 15-16, 2006). Nov. 15, 2006.

* cited by examiner

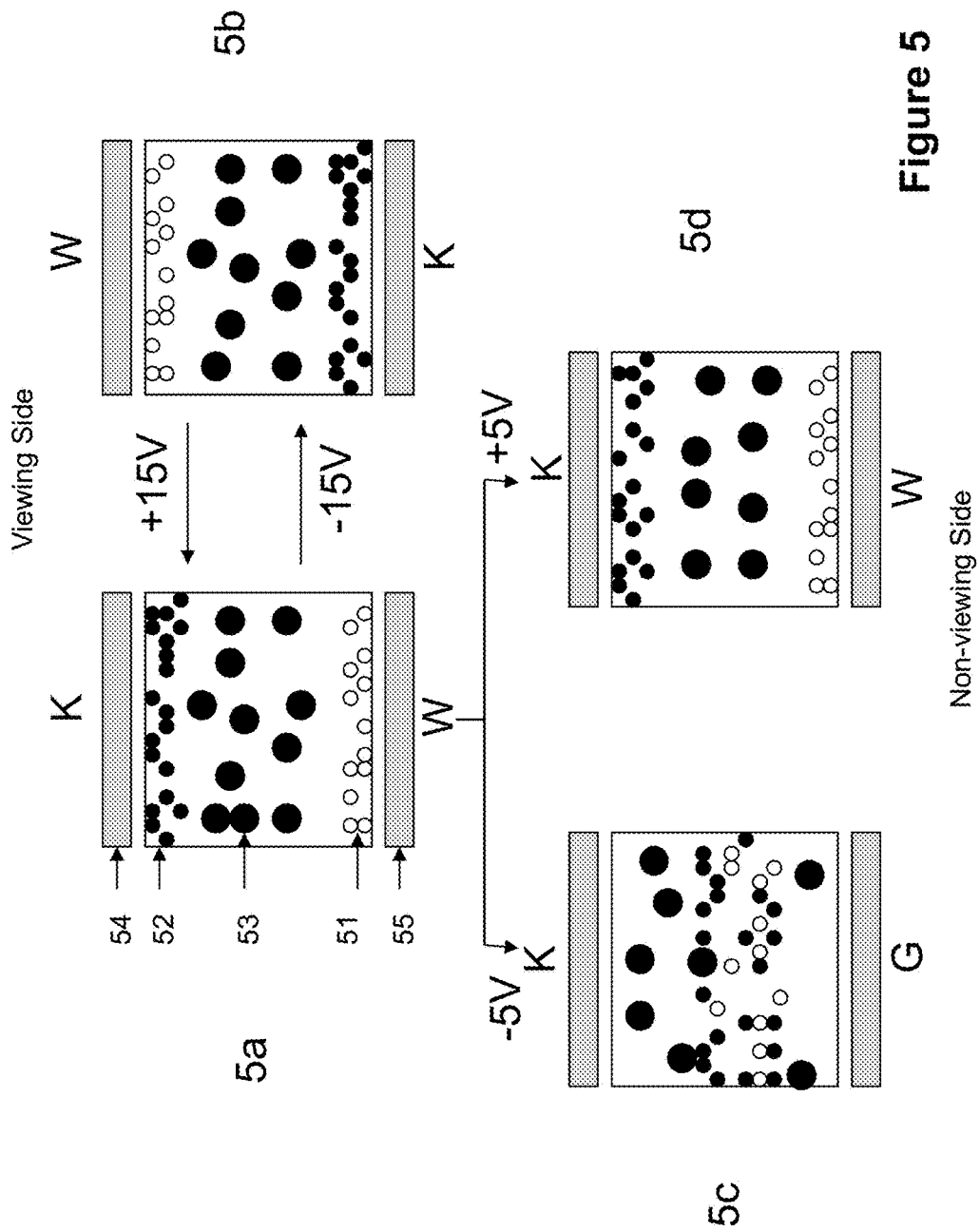

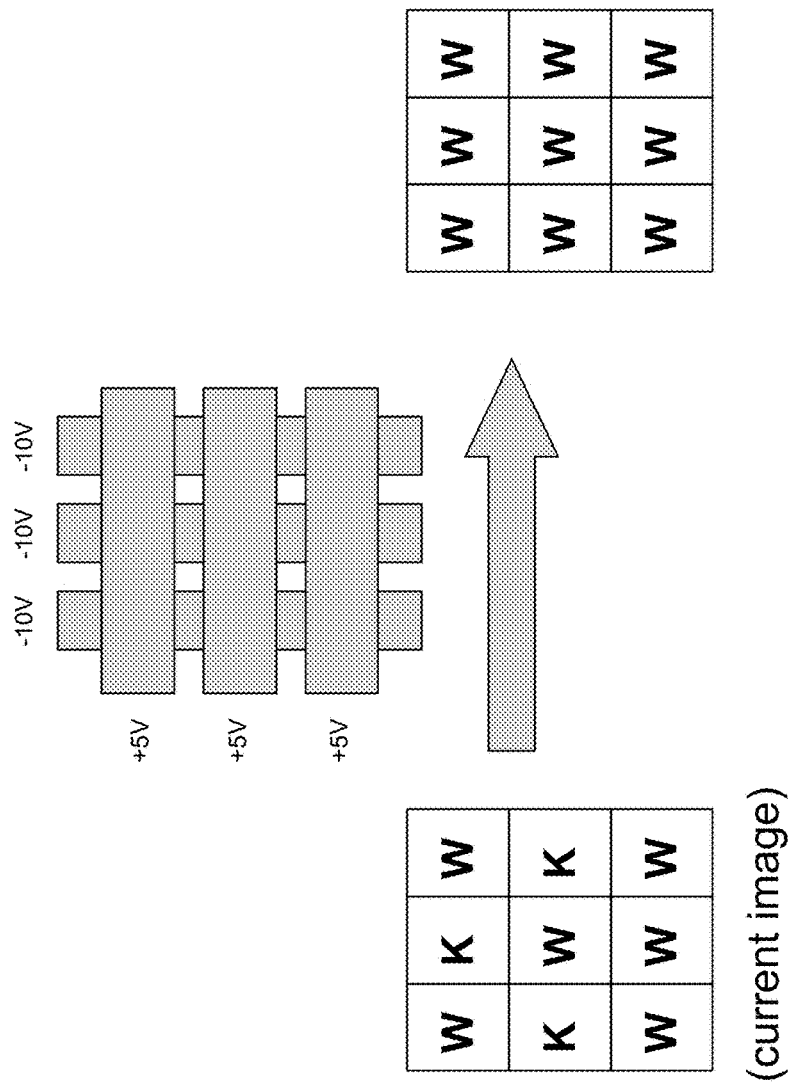
Figure 7a: Step 1

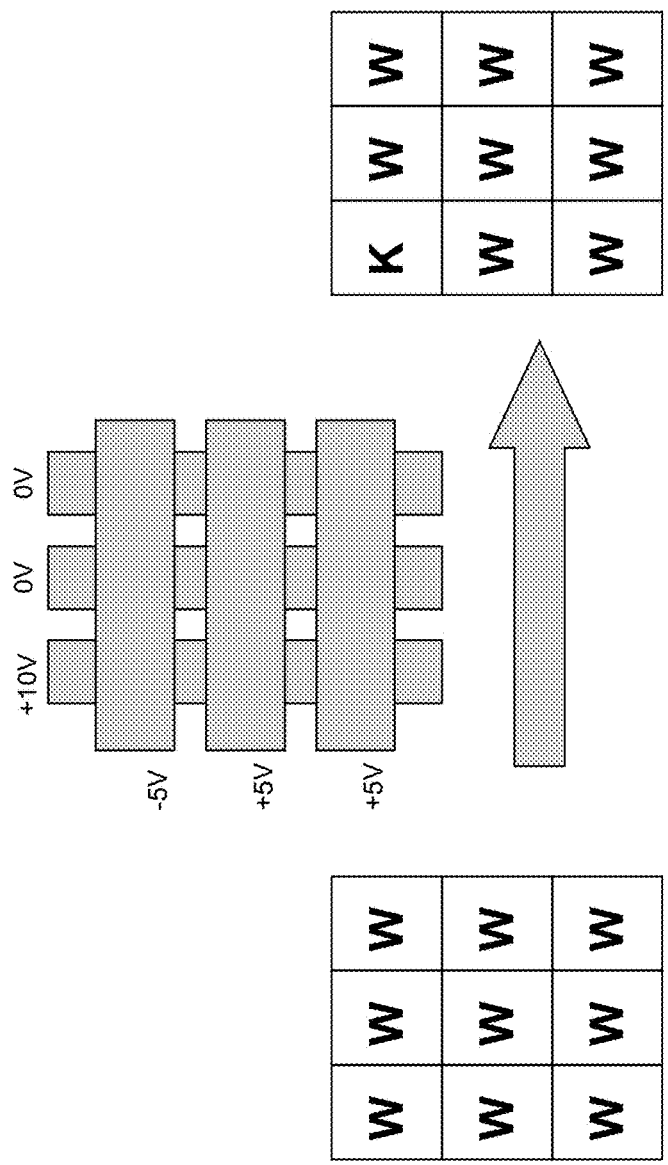
Figure 7b: Step 2

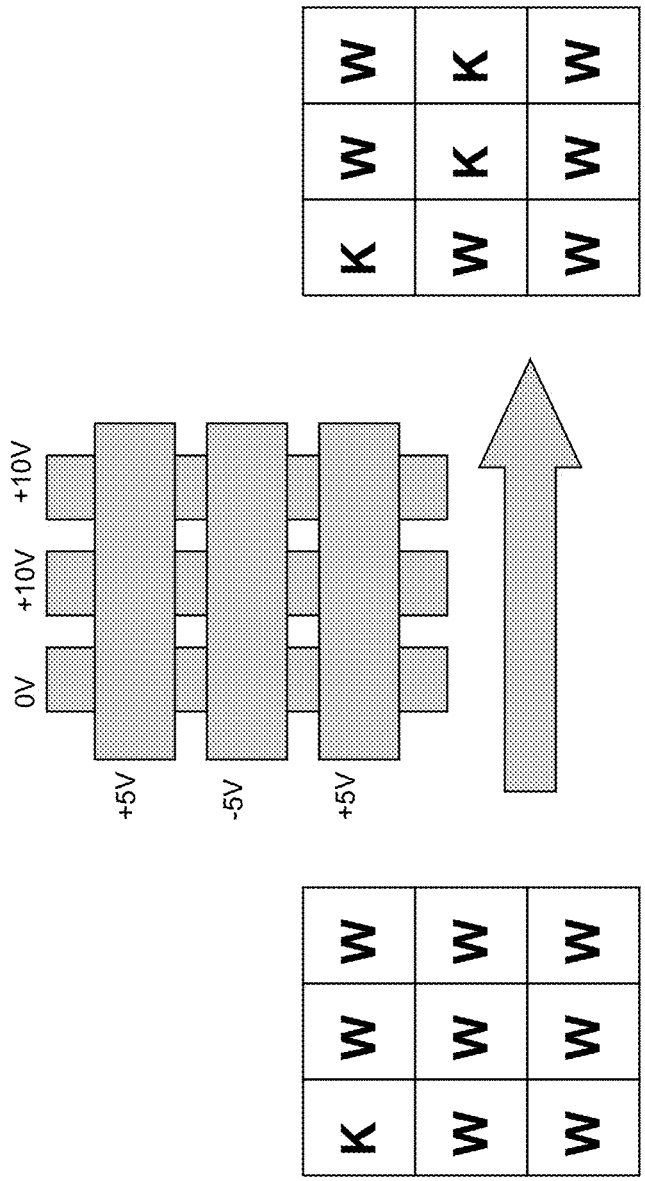
Figure 7c: Step 3

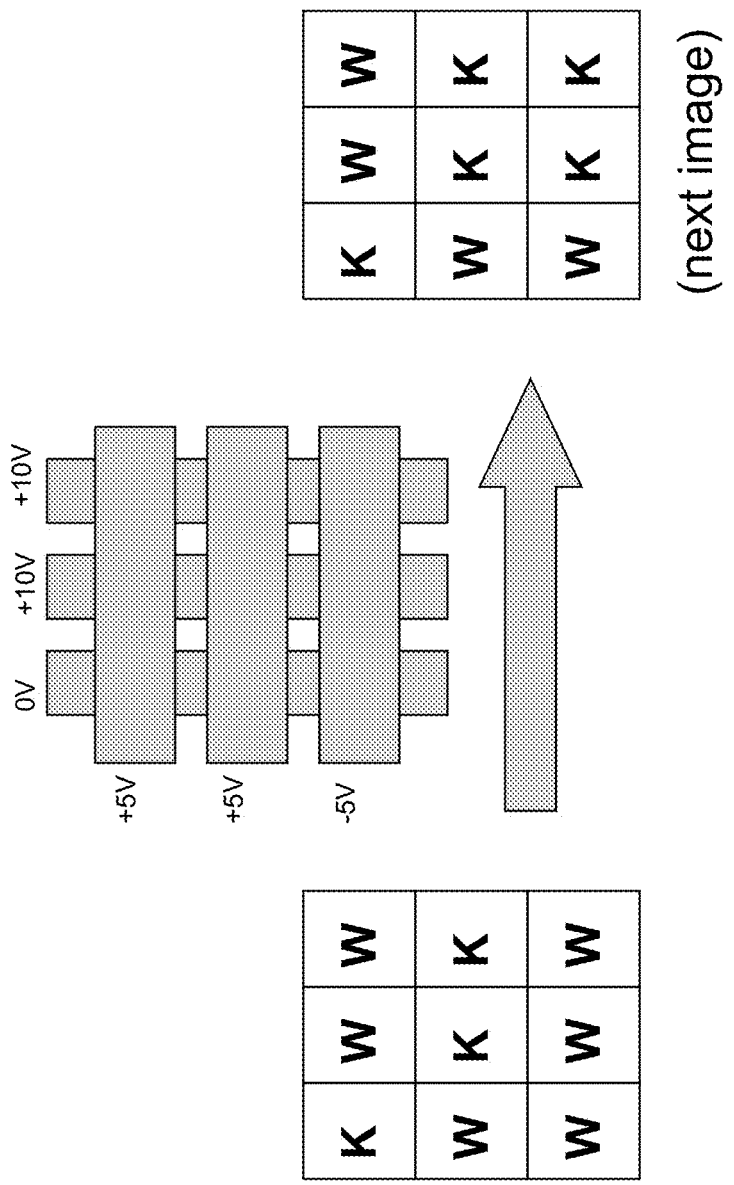
Figure 7d: Step 4

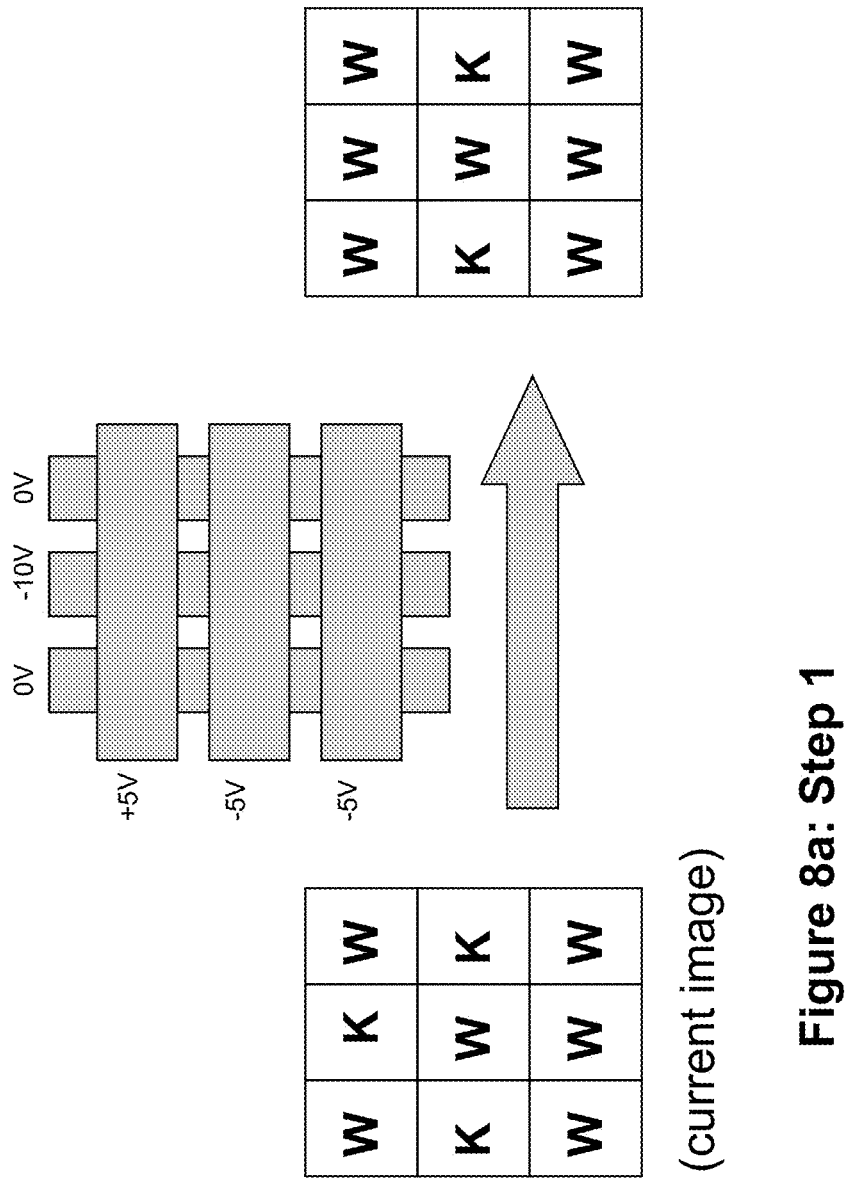
Figure 8a: Step 1

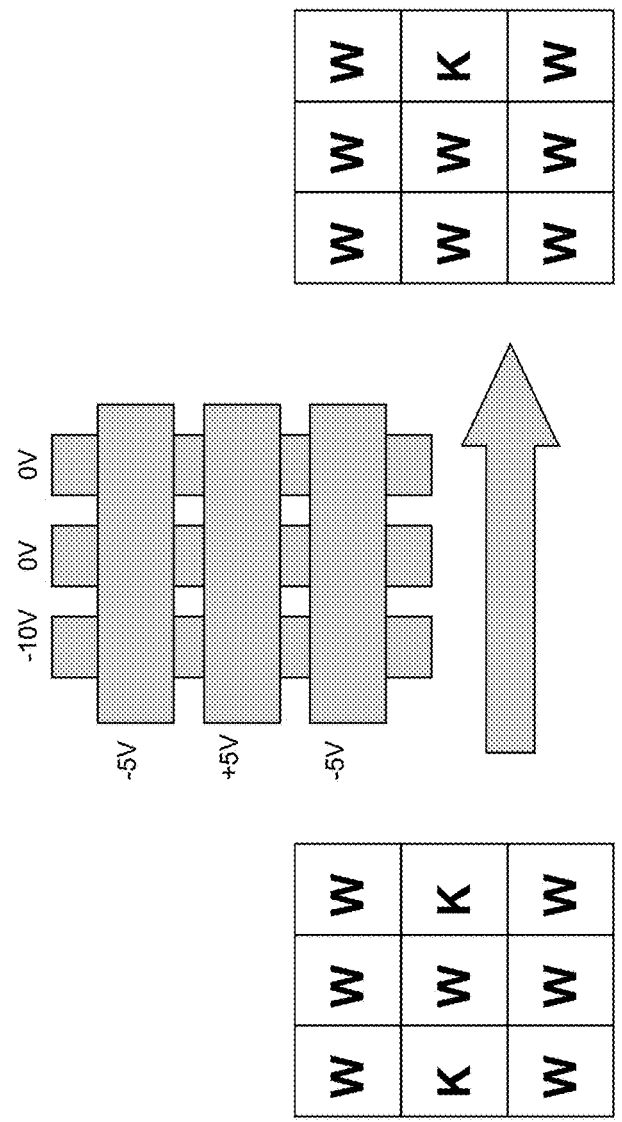
Figure 8b: Step 2

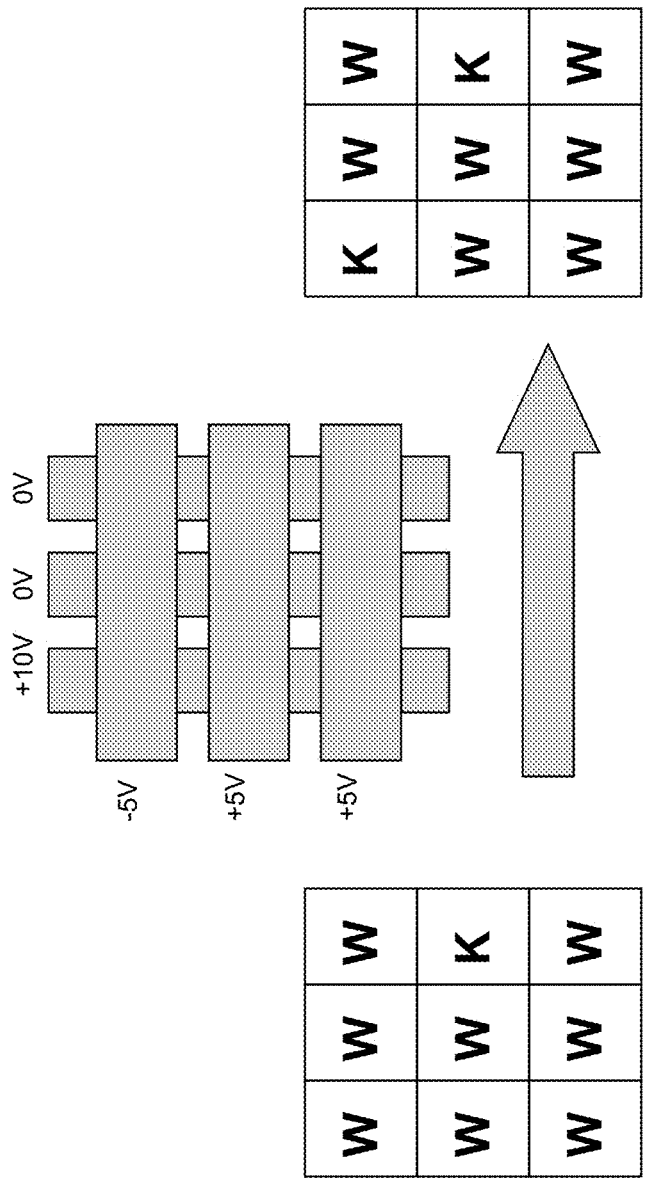
Figure 8c: Step 3

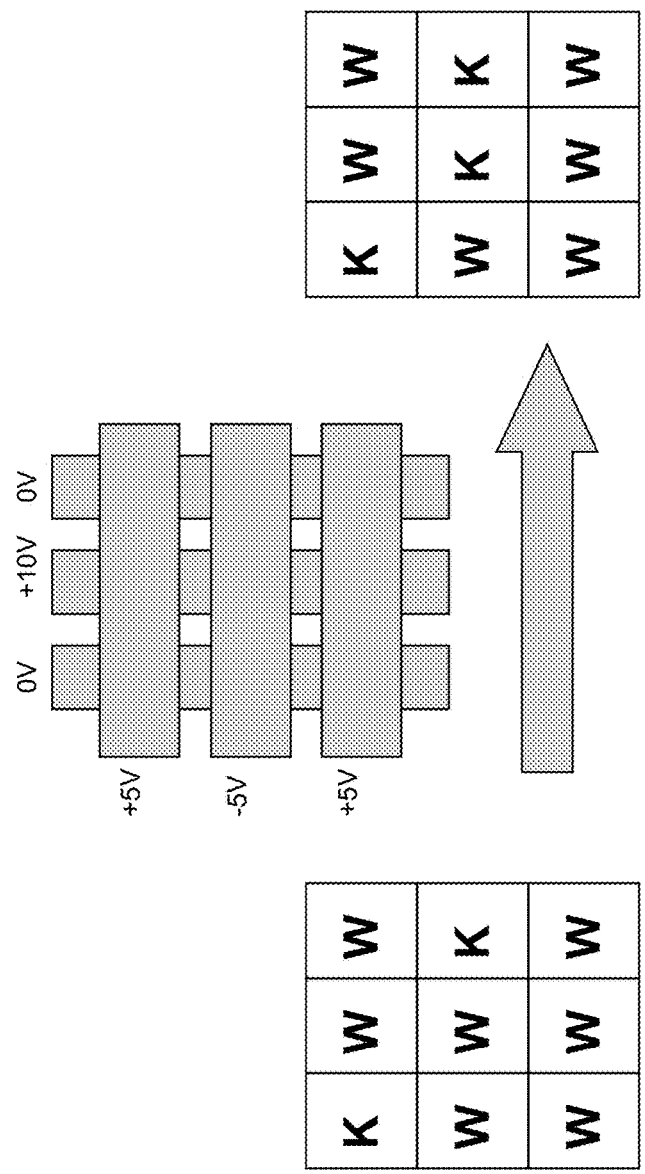
Figure 8d: Step 4

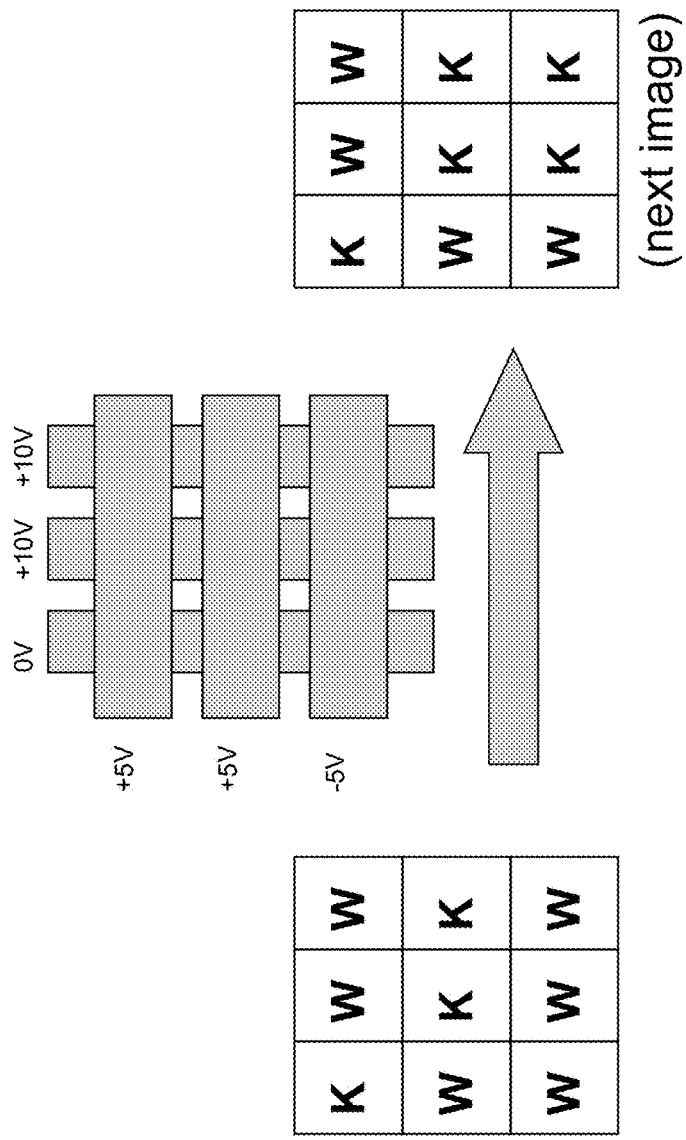
Figure 8e: Step 5

METHOD FOR DRIVING A PASSIVE MATRIX FOR AN ELECTROPHORETIC DISPLAY

RELATED APPLICATIONS

The application is a continuation of U.S. application Ser. No. 14/849,480, filed Sep. 9, 2015, now U.S. Pat. No. 9,557,623, which is a continuation-in-part of U.S. application Ser. No. 13/853,367, filed Mar. 29, 2013, and published as U.S. 2014/0293398, which is incorporated herein by reference in its entirety.

FIELD OF THE INVENTION

The present invention is directed to electrophoretic display designs and methods for driving such electrophoretic displays.

BACKGROUND OF THE INVENTION

The electrophoretic display (EPD) is a non-emissive device based on the electrophoresis phenomenon of charged pigment particles dispersed in a solvent. The display typically comprises two plates with electrodes placed opposing each other. One of the electrodes is usually transparent. An electrophoretic fluid composed of a solvent with charged pigment particles dispersed therein is enclosed between the two plates. When a voltage difference is imposed between the two electrodes, the pigment particles migrate to one side or the other causing either the color of the pigment particles or the color of the solvent being seen from the viewing side.

Alternatively, an electrophoretic fluid may comprise two types of charged pigment particles of contrasting colors and carrying opposite charges, and the two types of the charged pigment particles are dispersed in a clear solvent or solvent mixture. In this case, when a voltage difference is imposed between the two electrode plates, the two types of the charged pigment particles would move to opposite ends. Thus one of the colors of the two types of the charged pigment particles will be seen at the viewing side.

BRIEF DISCUSSION OF THE DRAWINGS

Figure 6A:
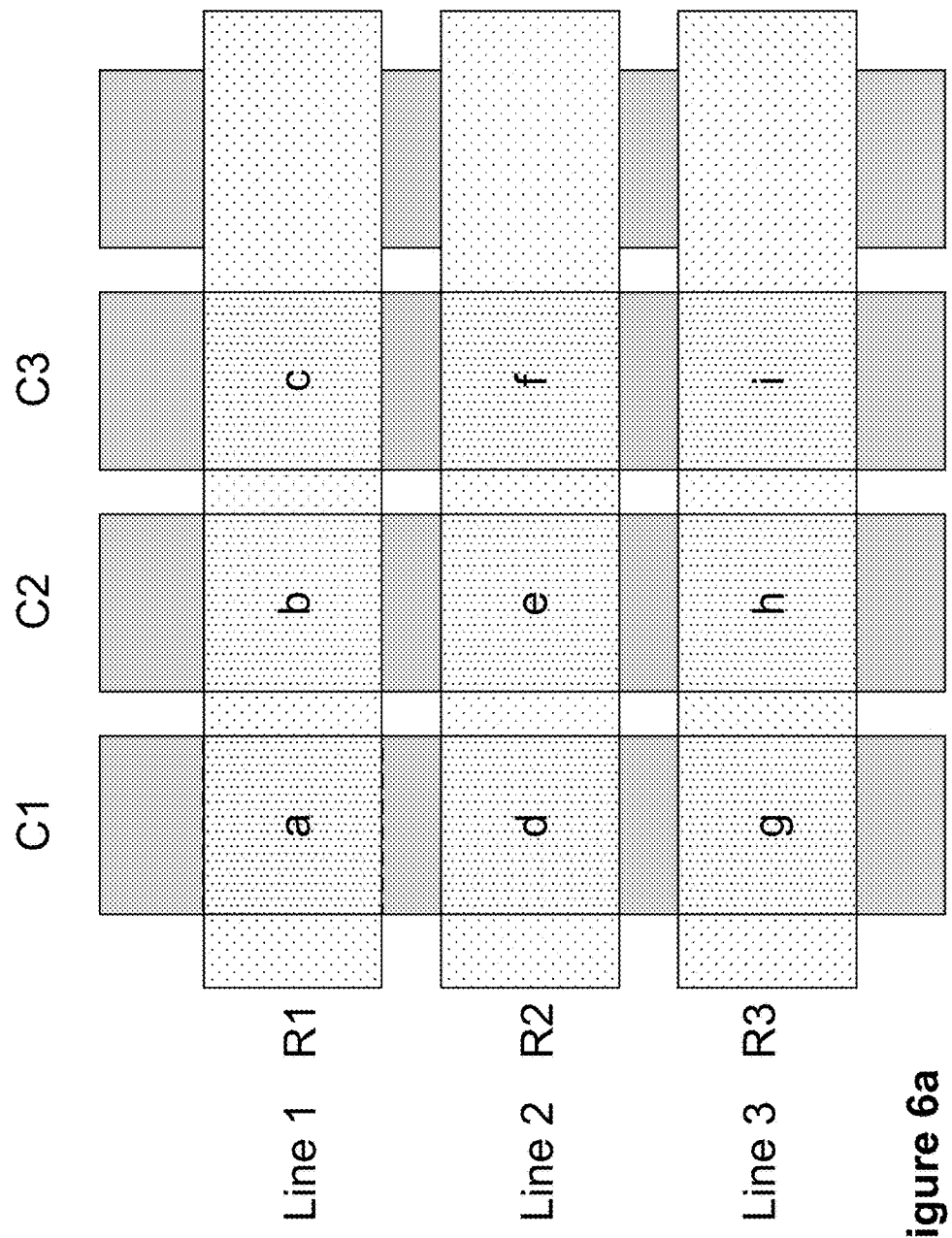
Figure 6B:
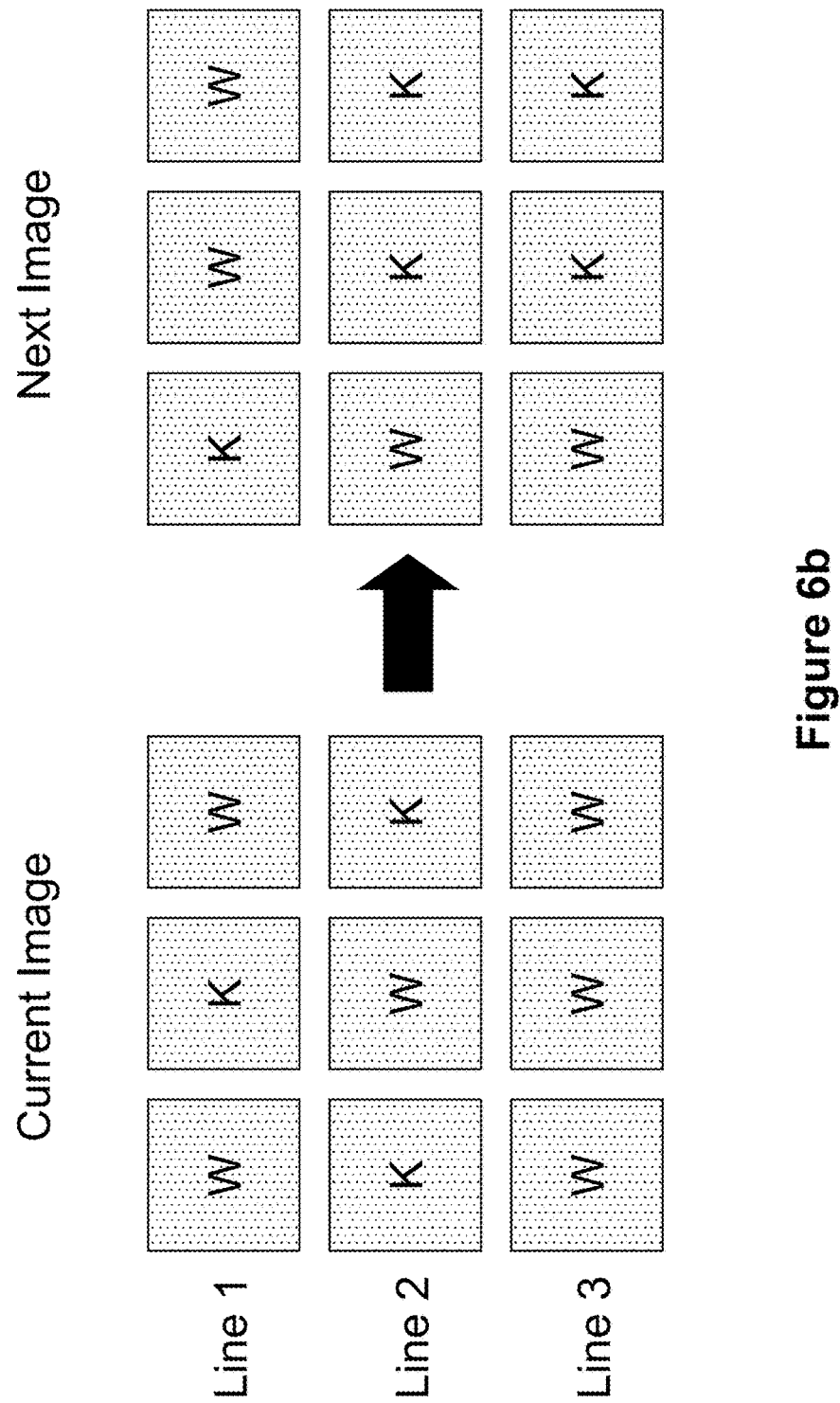

FIG. 1 depicts an electrophoretic display.
FIGS. 2-5 illustrate different designs of electrophoretic display.
FIGS. 6a-6b illustrate a passive matrix driving system.
FIGS. 7a-7d illustrate a passive matrix driving method utilizing the electrophoretic display of FIGS. 2-5.
FIGS. 8a-8e illustrate an alternative driving method.

DETAILED DESCRIPTION OF THE INVENTION

An electrophoretic display is depicted in FIG. 1, wherein an electrophoretic fluid (10) is sandwiched between two electrode layers (14 and 15).

For active matrix driving, one of the electrode layers (14) is a common electrode which is a transparent electrode layer (e.g., ITO), spreading over the entire top of the display device and the other electrode layer (15) is a layer of pixel electrodes (e.g., a thin-film-transistor backplane).

For passive matrix driving, one of the electrode layers has row electrodes and the other electrode layer has column electrodes and the row and column electrodes are perpendicular to each other. The present invention is particularly suitable for passive matrix driving.

The electrophoretic fluid in FIG. 1 is partitioned by the dotted lines, as individual pixels. For active matrix driving, each pixel has a corresponding pixel electrode. For passive matrix driving, a pixel is between a row electrode and a column electrode.

The fluid (10), as shown, comprises at least two types of pigment particles dispersed in a dielectric solvent or solvent mixture. For ease of illustration, the two types of pigment particles may be referred to as white particles (11) and black particles (12), as shown in FIG. 1. However, it is understood that the scope of the invention broadly encompasses pigment particles of any colors as long as the two types of pigment particles have visually contrasting colors.

For the white particles (11), they may be formed from an inorganic pigment, such as $TiO_2$, $ZrO_2$, $ZnO$, $Al_2O_3$, $Sb_2O_3$, $BaSO_4$, $PbSO_4$ or the like.

For the black particles (12), they may be formed from CI pigment black 26 or 28 or the like (e.g., manganese ferrite black spinel or copper chromite black spinel) or carbon black.

The particles may be encapsulated or polymer coated.

The solvent in which the three types of pigment particles are dispersed may be clear and colorless. It preferably has a low viscosity and a dielectric constant in the range of about 2 to about 30, preferably about 2 to about 15 for high particle mobility. Examples of suitable dielectric solvent include hydrocarbons such as isopar, decahydronaphthalene (DECALIN), 5-ethylidene-2-norbornene, fatty oils, paraffin oil, silicon fluids, aromatic hydrocarbons such as toluene, xylene, phenylxylylethane, dodecylbenzene or alkylnaphthalene, halogenated solvents such as perfluorodecalin, perfluorotoluene, perfluoroxylene, dichlorobenzotrifluoride, 3,4,5-trichlorobenzotrifluoride, chloropentafluoro-benzene, dichlorononane or pentachlorobenzene, and perfluorinated solvents such as FC-43, FC-70 or FC-5060 from 3M Company, St. Paul Minn., low molecular weight halogen containing polymers such as poly(perfluoropropylene oxide) from TCI America, Portland, Oreg., poly(chlorotrifluoroethylene) such as Halocarbon Oils from Halocarbon Product Corp., River Edge, N.J., perfluoropolyalkylether such as Galden from Ausimont or Krytox Oils and Greases K-Fluid Series from DuPont, Del. and polydimethylsiloxane based silicone oil from Dow-corning (DC-200).

The two types of pigment particles carry opposite charge polarities. For example, the black particles may be positively charged, then the white particles are negatively charged, or vice versa.

The relative charge intensity of the two types of particles is critical, especially in the case of passive matrix driving.

In general, in a black/white binary color system, if the black particles are positively charged, their zeta potential may be in the range of +120 to +180 mV and in this case, the zeta potential of the negatively charged white particles may be in the range of −30 to −60 mV. Alternatively, if the black particles are negatively charged, their zeta potential may be in the range of −20 to −60 mV and in this case, the zeta potential of the positively charged white particles may be in the range of +80 to +160 mV.

The charge intensity of the particles may be tuned by methods known in the art.

For example, for particles comprising core pigment particles surrounded by an inner layer which has a silane linking moiety with polar groups influencing charge of the particles and an outer polymer layer, the charge intensity of the particles may be tuned through the weight percentages of the inner and outer layers. This technique is described in US Patent Publication No. 2012-0313049, the content of which is incorporated herein by reference in its entirety. For example, the inner layer may be in the range of 4-8% by weight of the total weight of a particle for the black particles and in the range of 1-2% by weight of the total weight of a particle for the white particles. The outer polymer layer may be in the range of 2-4% by weight of the total weight of a particle for the black particles and in the range of 5-7% by weight of the total weight of a particle for the white particles.

For polymer coated particles, a co-monomer may be added in the reaction medium for forming a polymer shell over the core pigment particle, to incorporate functional groups for charge generation. The co-monomer may either directly charge the particles or have interaction with a charge control agent in the display fluid to bring a desired charge polarity and charge density to the particle. A co-monomer, for this purpose, is a monomer different from the monomer already in a composition for forming the polymer shell of the particles. When both a monomer and a co-monomer are present in a reaction medium for forming the polymer shell, the charge polarity or intensity of the pigment particles may be tuned to a desired level. This method is described in US Patent Publication No. 20 14-0011913, the content of which is incorporated herein by reference in its entirety.

In addition, a charge control agent may be added into an electrophoretic fluid to adjust the charge levels of the particles in the fluid. Suitable charge control agents are well known in the art; they may be polymeric or non-polymeric in nature or may be ionic or non-ionic. The ionic surfactants may include (a) the anionic type: alkane carboxylic salts, alkane sulfonic salts, such as Aerosol OT, alkyl-aromatic sulfonic salts, such as sodium dodecylbenzenesulfonate, isopropylamine, alkyl benzene sulfonate, phosphates, phosphoric salts or the like, and (b) the cationic type: fatty amine salts, quaternary ammonium salts, alkyl pyridium salts or the like. The non-ionic surfactants may include sorbitan monoesters, polyethoxylated nonionics, polybutene succinimide, maleic anhydride copolymers, vinylpyridine copolymers, vinylpyrrolidone copolymer (such as Ganex™ from International Specialty Products), (meth)acrylic acid copolymers, N,N-dimethylaminoethyl (meth)acrylate copolymers and the like.

Furthermore, a charge control agent compatible with the solvent in an electrophoretic fluid may be inserted between long-chain polymer stabilizers and attached directly to the exposed surface of the core pigment particles to effectively generate charges on the particles. Examples of such charge control agent may include, but are not limited to, Solsperse 17000 (active polymeric dispersant), Solsperse 9000 (active polymeric dispersant), OLOA 11000 (succinimide ashless dispersant), Unithox 750 (ethoxylates), Span 85 (sorbitan trioleate), Petronate L (sodium sulfonate), Alcolec LV30 (soy lecithin), Petrostep B100 (petroleum sulfonate) or B70 (barium sulfonate). This technique is described in US Patent Publication No. 2011/0242641, the content of which is incorporated herein by reference in its entirety.

Figure 2:
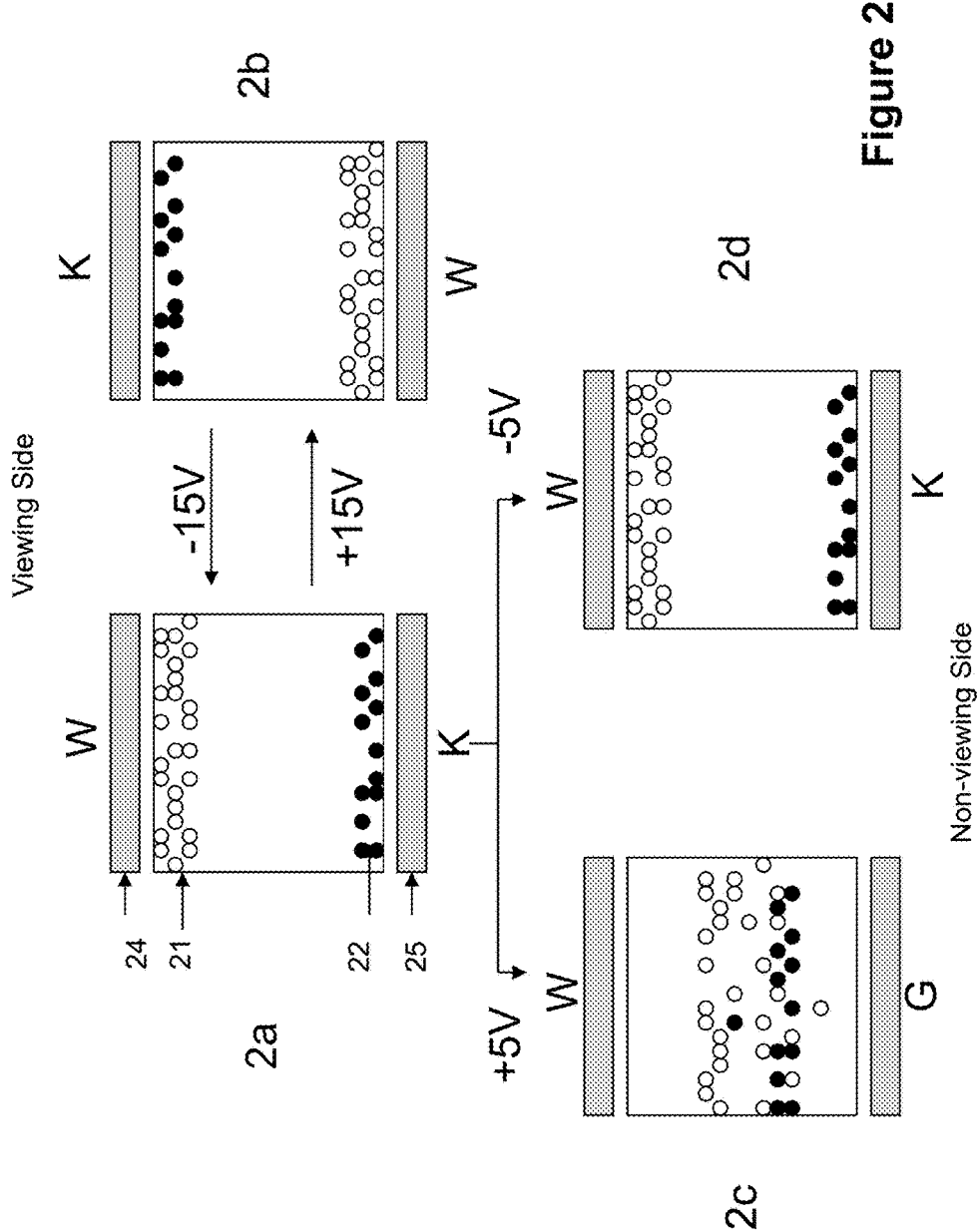

FIG. 2 depicts one of the electrophoretic display designs of the present invention. In this example, the white particles (21) are negatively charged while the black particles (22) are positively charged.

In this design, the volume of the white particles is higher than that of the black particles, and in this example, the volume of the black particles may be about 6% to about 15% of the volume of the white particles.

In general, when the white state is displayed and to be maintained, the volume of black particles is preferably 3% to 30%, and more preferably 5% to 25%, of the volume of the white particles.

The levels of charge intensity of the two types of particles are within the ranges as described above.

In FIG. 2a, when an applied voltage potential is −15V, the white particles (21) move to be near or at the top electrode (24) and the black particles (22) move to be near or at the bottom electrode (25). As a result, the white color is seen at the viewing side.

In FIG. 2b, when a voltage potential difference of +15V is applied, the white particles (21) move to be near or at the bottom electrode (25) and the black particles (22) move to be near or at the top electrode (24). As a result, the black color is seen at the viewing side.

In FIG. 2c, when a voltage potential difference of +5V (which is ⅓ of the voltage potential difference required to drive a pixel from a full white state to a full black state) is applied to the particles in FIG. 2a (that is, driving from a white color state), the negatively charged white particles (21) move towards the bottom electrode (25). The relative charge intensity of the white (21) and the black (22) particles is such that the black particles move little and as a result, the white color is still seen at the viewing side while a mixture of the white and the black particles gather at the non-viewing side to form a grey color (i.e., an intermediate color state between white and black).

The relative charge intensity of the two types of particles is critical in achieving the white color state at the viewing side and an intermediate color state at the non-viewing side, while one third of the voltage required to drive a pixel from a full white state to a full black state is applied, in FIG. 2c. The tuning of the charge intensities is discussed above.

In addition, while the white color state (i.e., a lighter color between the two colors) is displayed in FIG. 2c, the relative volume of the two types of particles is another important factor. In this example, because there is a higher amount of the white particles to block the view of the black particles, the color seen is white of a high quality.

In FIG. 2d, when a voltage potential difference of −5V (which is ⅓ of the voltage potential difference required to drive a pixel from a full black state to a full white state) is applied to the particles in FIG. 2a (that is, driving from a white color state), the black and white particles would barely move because of their respective charge polarities and therefore the color seen remains to be white at the viewing side.

Figure 3:
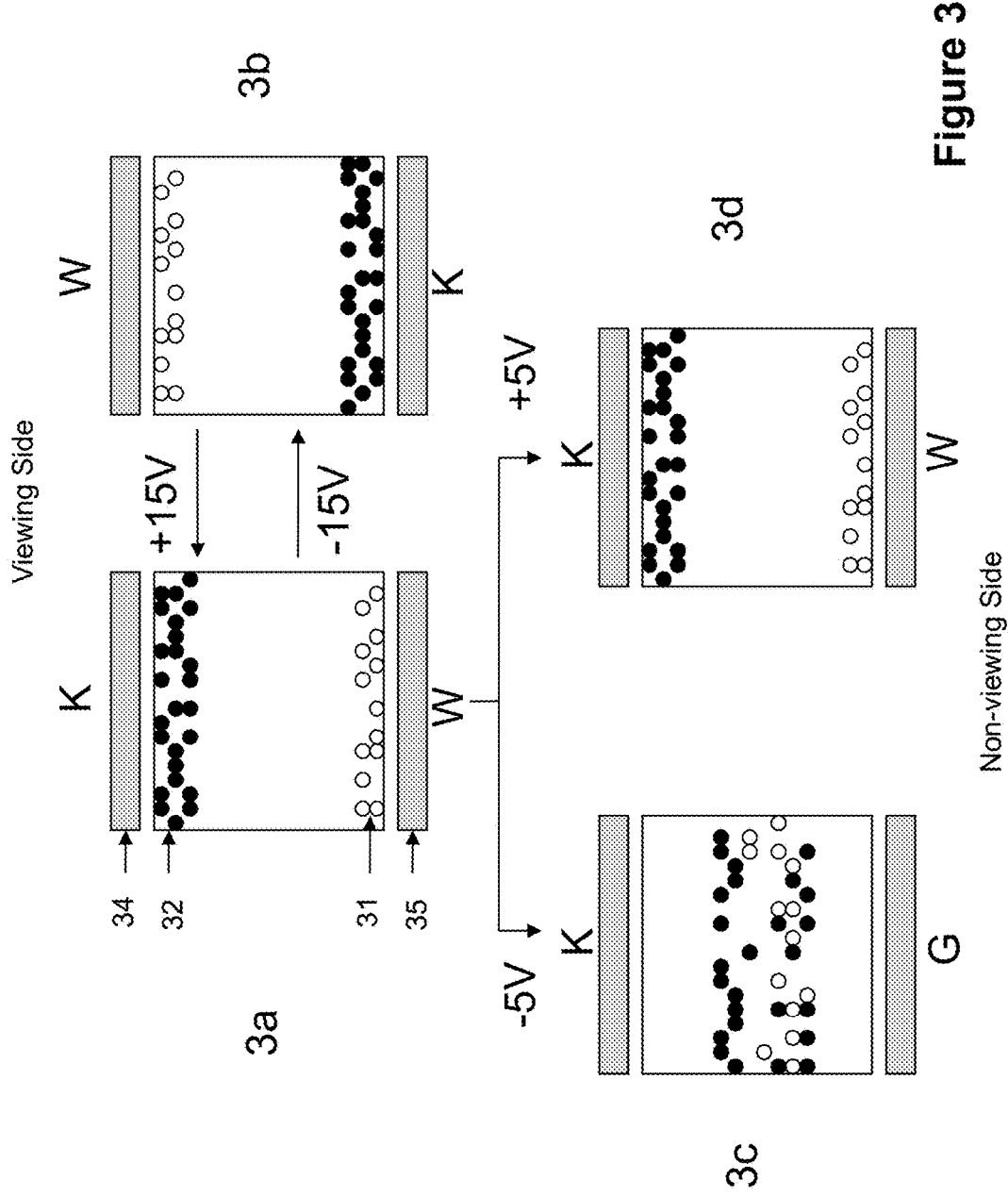

FIG. 3 depicts an alternative electrophoretic display design of the present invention. In this example, the white particles (31) are negatively charged while the black particles (32) are positively charged.

The volume of the black particles, in this example, is about 20% to about 50% of the volume of the white particles.

In general, when the black state is displayed and to be maintained as shown in FIG. 3, the volume of black particles is preferably 20% to 50% of the volume of the white particles.

The levels of charge intensity of the two types of particles are within the ranges as described above.

In FIG. 3a, when a voltage potential difference of +15V is applied, the white particles (31) move to be near or at the bottom electrode (35) and the black particles (32) move to be near or at the top electrode (34). As a result, the black color is seen at the viewing side.

In FIG. 3b, when an applied voltage potential is −15V, the white particles (31) move to be near or at the top electrode (34) and the black particles (32) move to be near or at the bottom electrode (35). As a result, the white color is seen at the viewing side.

In FIG. 3c, when a voltage potential difference of −5V (which is ⅓ of the voltage potential difference required to drive a pixel from a full black state to a full white state) is applied to the particles in FIG. 3a (that is, driving from a black color state), the positively charged black particles (32) move towards the bottom electrode (35). The relative charge intensity of the black and white particles is such that the white particles (31) move little and as a result, the black color is still seen at the viewing side while a mixture of the white and black particles gather at the non-viewing side to form a grey color (i.e., an intermediate color state between white and black).

The relative charge intensity of the two types of particles is critical in achieving the black color state at the viewing side and an intermediate color state at the non-viewing side while one third of the voltage required to drive a pixel from a full black state to a full white state is applied, in FIG. 3c. The tuning of the charge intensities is discussed above.

In FIG. 3d, when a voltage potential difference of +5V (which is ⅓ of the voltage potential difference required to drive a pixel from a full white state to a full black state) is applied to the particles in FIG. 3a (that is, driving from a black color state), the black and white particles would barely move because of their respective charge polarities and therefore the color seen remains to be black at the viewing side.

Figure 4:
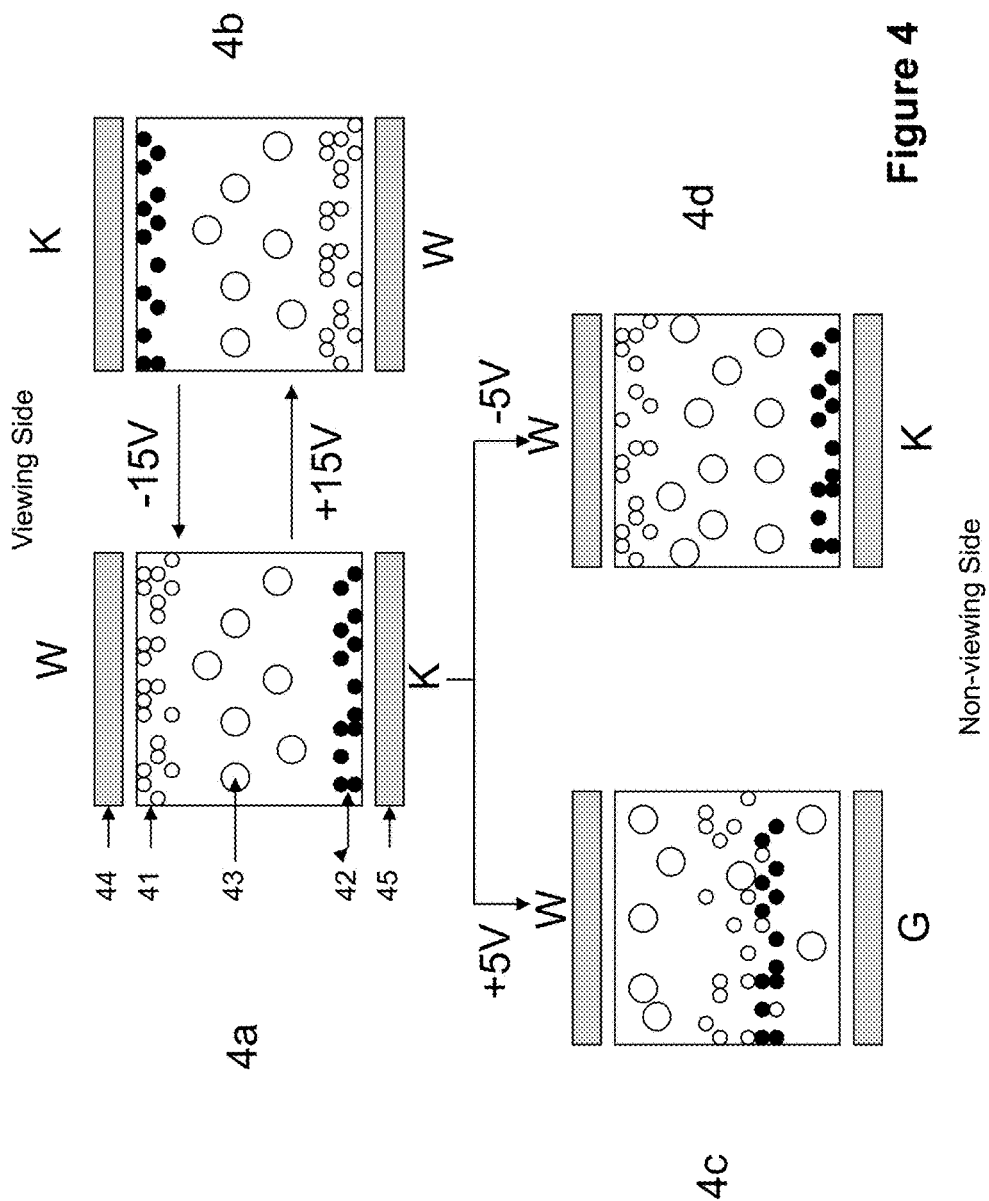

In another alternative design as shown in FIG. 4, a third type (43) of particles is added.

In FIG. 4, the third type (43) of particles which is of the white color is dispersed in the fluid. However, they barely move when a voltage potential is applied to the fluid, because they are non-charged or slightly charged. FIGS. 4(a) to 4(d) are similar to FIGS. 2(a) to 2(d), respectively, except that there is the third type of particles in the fluid in FIG. 4. More details of the third type of particles are given in a section below.

While the third type of particles is present, even though there is not a sufficient amount of the white particles present, the third type of particles would block the view of the black particles from the viewing side to allow a high quality white color to be seen.

In FIG. 5, the third type (53) of particles which is of the black color is dispersed in the fluid. However, they barely move when a voltage potential is applied to the fluid, because they are non-charged or slightly charged. FIGS. 5(a) to 5(d) are similar to FIGS. 3(a) to 3(d), respectively, except that there is the third type of particles in the fluid in FIG. 5.

It is noted that while one third of the voltage required to drive a pixel from a first color state (e.g., white) to a second color state (e.g., black) or from the second color state to the first color state is applied in FIGS. 2c, 2d, 3c, 3d, 4c, 4d, 5c and 5d, in practice, the voltage applied may be higher than that. In other words, the voltage applied in those figures may be at least one third of the voltage required to drive a pixel from a first color state to a second color state or from the second color state to the first color state The third type of particles in FIGS. 4 and 5 may be larger than the oppositely charged black and white particles. For example, both the black (42 or 52) and the white (41 or 51) particles may have a size ranging from about 50 nm to about 800 nm and more preferably from about 200 nm to about 700 nm, and the third type (43 or 53) of particles may be about 2 to about 50 times, and more preferably about 2 to about 10 times, the size of the black particles or the white particles.

The third type of particles in FIG. 4 or 5 preferably has a color which is the same as one of the two types of charged particles. For example, if the two types of charged particles are black and white, the third type of particles is either white or black. The third type of particles may be formed from the materials described above for the black and white particles.

The third type of particles may also be formed from a polymeric material. The polymeric material may be a copolymer or a homopolymer. Examples of the polymeric material may include, but are not limited to, polyacrylate, polymethacrylate, polystyrene, polyaniline, polypyrrole, polyphenol, polysiloxane or the like. More specific examples of the polymeric material may include, but are not limited to, poly(pentabromophenyl methacrylate), poly(2-vinylnaphthalene), poly(naphthyl methacrylate), poly(alpha-methylstyrene), poly(N-benzyl methacrylamide) or poly(benzyl methacrylate).

In addition, the third type of particles is preferably slightly charged. The term "slightly charged" is defined as having a charge intensity which is less than 50%, preferably less than 25% and more preferably less than 10%, of the average charge intensity carried by the positively or negatively charged pigment particles.

In one embodiment, the charge intensity may be measured in terms of zeta potential. In one embodiment, the zeta potential is determined by Colloidal Dynamics AcoustoSizer IIM with a CSPU-100 signal processing unit, ESA EN# Attn flow through cell (K:127). The instrument constants, such as density of the solvent used in the sample, dielectric constant of the solvent, speed of sound in the solvent, viscosity of the solvent, all of which at the testing temperature (25° C.) are entered before testing. Pigment samples are dispersed in the solvent (which is usually a hydrocarbon fluid having less than 12 carbon atoms), and diluted to between 5-10% by weight. The sample also contains a charge control agent (Solsperse 17000®, available from Lubrizol Corporation, a Berkshire Hathaway company; "Solsperse" is a Registered Trade Mark), with a weight ratio of 1:10 of the charge control agent to the particles. The mass of the diluted sample is determined and the sample is then loaded into a flow through cell for determination of the zeta potential.

The non-charged or slightly charged particles may have a zeta potential of −20 to +20 mV.

In one embodiment, the third type of particles is slightly charged and it has a different level of mobility than those of the black and white particles.

The concentration of the third type of particles is less than 25%, preferably less than 10%, by volume in the fluid.

There may be other particulate matters in the fluid which are included as additives to enhance performance of the display device, such as switching speed, imaging bistability and reliability.

The electrophoretic fluid in an electrophoretic display device is filled in display cells. The display cells may be microcells as described in U.S. Pat. No. 6,930,818, the content of which is incorporated herein by reference in its entirety. The display cells may also be other types of micro-containers, such as microcapsules, microchannels or equivalents, regardless of their shapes or sizes. All of these are within the scope of the present application.

The display designs of FIGS. 2-5 may be driven by an active matrix driving system or a passive matrix driving system. However, the designs are particularly suitable for passive matrix driving, examples of which are given below.

FIG. 6a depicts a typical passive matrix configuration. As shown the column electrodes (C1-C3) are perpendicular to the row electrodes (R1-R3). In this example, the column electrodes are shown to be underneath the row electrodes. The spaces where the row electrodes and the column electrodes overlap are pixels and therefore for each pixel, the row electrode would be the top electrode and the column electrode would be the bottom electrode. The 9 pixels shown are pixels (a)-(e), for illustration purpose. Pixels (a)-(c) are at line 1; pixels (d)-(f) are at line 2; and pixels (g)-(i) are at line 3.

In FIG. 6b, two images are shown. In the current image, pixels (a)-(i) are W (white), K (black), W, K, W, K, W, W and W, respectively. In the next image, pixels (a)-(i) are K, W, W, W, K, K, W, K and K, respectively. The following examples demonstrate methods for driving the current image to the next image.

Example 1

FIGS. 7a-7d shows the steps of one of the passive matrix driving methods. In step 1 (FIG. 7a), all pixels (a)-(i) are driven to the white state regardless of their current color states. To accomplish this, all column electrodes C1-C3 are applied a voltage of −10V and all row electrodes R1-R3 are applied a voltage of +5V. As a result, all of pixels sense a driving voltage of −15V and therefore switch to the white state (see FIGS. 2a, 3b, 4a and 5b).

In the next step (FIG. 7b), only line 1 is driven to switch any pixels to black if the pixels are to be in the black state in the next image. In this example, pixel (a) is the only pixel that needs to be driven to the black state (see FIG. 6b). To accomplish this, column electrodes C1-C3 are applied voltages of +10V, 0V and 0V, respectively, and row electrodes R1-R3 are applied voltages of −5V, +5V and +5V, respectively. As a result, pixel (a) senses a driving voltage of +15V, and therefore switches to the black state (see FIGS. 2b, 3a, 4b and 5a). The colors of remaining pixels sensing a voltage of +5V or −5V will remain white (see FIGS. 2c, 2d, 4c and 4d).

In the next step (FIG. 7c), only line 2 is driven to switch any pixels to black if the pixels are to be in the black state in the next image. In this example, pixels (e) and (f) are the only pixels that need to be driven to the black state (FIG. 6b). To accomplish this, column electrodes C1-C3 are applied voltages of 0V, +10V and +10V, respectively and row electrodes R1-R3 are applied voltages of +5V, −5V and +5V, respectively. Both pixels (e) and (f) sense a driving voltage of +15V and therefore switch from white to black and the remaining pixels sensing a voltage of either +5V or −5V remain unchanged in their color states.

In the next step (FIG. 7d), only line 3 is driven to switch any pixels to black if the pixels are to be in the black state in the next image. In this example, pixels (h) and (i) are the only pixels that need to be driven to the black state (FIG. 6b). To accomplish this, column electrodes C1-C3 are applied voltages of 0V, +10V and +10V, respectively and row electrodes R1-R3 are applied voltages of +5V, +5V and −5V, respectively. Both pixels (h) and (i) sense a driving voltage of +15V and therefore switch from white to black and the remaining pixels sense a voltage of either +5V or −5V and therefore their colors remain unchanged.

The driving, as shown, after the initial step of driving all pixels to the white color state, is carried out, line by line, until the last line when all of the pixels have been driven to their color states in the next image.

While black and white color states are used to exemplify the method, it is understood that the present method can be applied to any two color states as long as the two color states are visually distinguishable. Therefore the driving method may be summarized as:

A driving method for driving a display device as described above having a binary color system of a first color and a second color, from a current image to a next image, which method comprises (a) driving all pixels to the first color regardless of their colors in the current and next images; and (b) driving, line by line, any pixels which are in the second color in the next image, from the first color to the second color.

Example 2

FIGS. 8a-8e illustrate the steps of an alternative driving method. The pixels in this method are driven, line by line, and in this example, black pixels are driven to white before white pixels are driven to black.

In step 1 (FIG. 8a), only line 1 is driven to switch any black pixels to white if the pixels are to be in the white state in the next image. In this example, pixel (b) at line 1 is the only pixel that needs to be driven from black to white. To accomplish this, column electrodes C1-C3 are applied voltages of 0V, −10V and 0V, respectively and row electrodes R1-R3 are applied voltages of +5V, −5V and −5V, respectively. As a result, pixel (b) senses a voltage of −15V, and therefore switches to the white state (see FIGS. 2a, 3b, 4a and 5b). The colors of the remaining pixels which sense a voltage of +5V or −5V will remain unchanged.

In the next step (FIG. 8b), only line 2 is driven to switch any pixels from black to white if the pixels are to be in the white state in the next image. In this example, pixel (d) is the only pixel that needs to be driven from black to white. To accomplish this, column electrodes C1-C3 are applied voltages of −10V, 0V and 0V, respectively and row electrodes R1-R3 are applied voltages of −5V, +5V and −5V, respectively. Pixel (d) senses a driving voltage of −15V and switches from black to white and the remaining pixels sense a voltage of either +5V or −5V and their colors remain unchanged.

There are no pixels at line 3 that need to be driven from black to white.

In the next step (FIG. 8c), only line 1 is driven to switch any pixels from white to black if the pixels are to be in the black state in the next image. In this example, pixel (a) is the only pixel that needs to be driven to the black state. To accomplish this, column electrodes C1-C3 are applied voltages of +10V, 0V and 0V, respectively and row electrodes R1-R3 are applied voltages of −5V, +5V and +5V, respectively. Pixel (a) senses a driving voltage of +15V and therefore switches from white to black and the remaining pixels sense a voltage of either +5V or −5V and therefore their colors remain unchanged.

In the next step (FIG. 8d), only line 2 is driven to switch any pixels from white to black if the pixels are to be in the black state in the next image. In this example, pixel (e) is the only pixel that needs to be driven to the black state. To accomplish this, column electrodes C1-C3 are applied voltages of 0V, +10V and 0V, respectively and row electrodes R1-R3 are applied voltages of +5V, −5V and +5V, respectively. Pixel (e) senses a driving voltage of +15V and as a result, switches from white to black and the remaining pixels sense a voltage of either +5V or −5V and their colors remain unchanged.

In the next step (FIG. 8e), only line 3 is driven to switch any pixels from white to black if the pixels are to be in the black state in the next image. In this example, pixels (h) and (i) are the only pixels that need to be driven to the black state. To accomplish this, column electrodes C1-C3 are applied voltages of 0V, +10V and +10V, respectively and row electrodes R1-R3 are applied voltages of +5V, +5V and −5V, respectively. Pixels (h) and (i) sense a driving voltage of +15V and as a result, switch from white to black and the remaining pixels sense a voltage of either +5V or −5V and their colors remain unchanged.

The driving, as shown, is carried out, line by line, until the last line when all pixels have been driven to their color states in the next image.

Accordingly, this alternative driving method may be summarized as:

A driving method for driving a display device of a binary color system of a first color and a second color, from a current image to a next image, which method comprises (a) driving, line by line, pixels having the first color in the current image and having the second color in the next image, from the first color to the second color; and (b) driving, line by line, pixels having the second color in the current image and having the first color in the next image, from the second color to the first color.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. A method for driving a passive matrix electrophoretic display between colored states, the passive-matrix electrophoretic display including a first set of electrodes on a viewing side of an electrophoretic medium and a second set of electrodes on a non-viewing side of the electrophoretic medium, wherein the electrophoretic medium includes first, second, and third types of particles, the first type of particles being oppositely-charged and differently-colored than the second type of particles, and the third type of particles being less charged and larger in diameter than the first and second types of particles, the method comprising:

providing a first voltage ($V_1$) to a first electrode belonging to the first set of electrodes; and providing a second voltage ($V_2$) to a second electrode belonging to the second set of electrodes, wherein $2|V_1|=|V_2|$, and wherein the passive matrix electrophoretic display does not switch between colored states when only the first voltage ($V_1$) is provided.

2. The method of claim 1, wherein the first set of electrodes are row electrodes and the second set of electrodes are column electrodes.

3. The method of claim 1, wherein the first type of particles have a charge density at least twice as large as that of the second type of particles.

4. The method of claim 1, wherein the first and second types of particles are black and white, respectively.

5. The method of claim 4, wherein the white particles are negatively charged and the black particles are positively charged, or vice versa.

6. The method of claim 4, wherein the volume of the black particles is about 3% to about 30% of the volume of the white particles.

7. The method of claim 4, wherein the third type of particles is white or black.

8. The method of claim 1, wherein the third type of particles is about 2 to about 50 times the size of the first and second types of particles.

9. The method of claim 1, wherein the concentration of the third type of particles is less than 25% by volume in the electrophoretic medium.

10. The method of claim 1, wherein the zeta potential of the first particle is in the range of +120 to +180 mV and the zeta potential of the second particle is in the range of −30 to −60 mV.

11. The method of claim 1, wherein the zeta potential of the first particle is in the range of +80 to +160 mV and the zeta potential of the second particle is in the range of −20 to −60 mV.

12. The method of claim 1, further comprising providing the first voltage ($V_1$) to a third electrode belonging to the first set of electrodes.

13. The method of claim 12, further comprising providing the second voltage ($V_2$) to a fourth electrode belonging to the second set of electrodes.

14. The method of claim 1, wherein the passive matrix electrophoretic display does not switch between colored states when only the second voltage ($V_2$) is provided.

15. The method of claim 1, wherein $|V_1|$ is approximately 5 Volts, and $|V_2|$ is approximately 10 Volts.

* * * * *